(12) United States Patent
Antchak et al.

(10) Patent No.: US 9,982,721 B2
(45) Date of Patent: May 29, 2018

(54) DECOUPLER WITH TUNED DAMPING AND METHODS ASSOCIATED THEREWITH

(75) Inventors: John R. Antchak, Innisfil (CA); Jun Xu, Woodbridge (CA); Patrick Marion, Toronto (CA); Lucas Wilson, Toronto (CA); Justin Boudreau, Callander (CA); Gary J. Spicer, Mississauga (CA)

(73) Assignee: Litens Automotive Partnership, Woodbridge, ON (CA)

( * ) Notice: Subject to any disclaimer, the term of this patent is extended or adjusted under 35 U.S.C. 154(b) by 445 days.

(21) Appl. No.: 13/878,879

(22) PCT Filed: Nov. 14, 2011

(86) PCT No.: PCT/CA2011/001263
§ 371 (c)(1),
(2), (4) Date: Apr. 11, 2013

(87) PCT Pub. No.: WO2012/061936
PCT Pub. Date: May 18, 2012

(65) Prior Publication Data
US 2013/0217524 A1    Aug. 22, 2013

Related U.S. Application Data

(60) Provisional application No. 61/413,475, filed on Nov. 14, 2010, provisional application No. 61/414,682, filed on Nov. 17, 2010.

(51) Int. Cl.
*F16D 3/12* (2006.01)
*F16D 3/14* (2006.01)
(Continued)

(52) U.S. Cl.
CPC .......... *F16D 3/12* (2013.01); *F02B 67/06* (2013.01); *F16D 3/14* (2013.01); *F16D 7/025* (2013.01);
(Continued)

(58) Field of Classification Search
CPC ........... F16D 3/12; F16F 15/123; F16H 55/36
(Continued)

(56) References Cited

U.S. PATENT DOCUMENTS 3,249,187 A    5/1966 McDowall
4,689,037 A *  8/1987 Bytzek .................... 474/135
(Continued)

FOREIGN PATENT DOCUMENTS

CA    2547383 A1    6/2005
CA    2713897 A1    8/2009
(Continued)

OTHER PUBLICATIONS

PCT/CA2011/001263, Search Report, dated Feb. 24, 2012.
(Continued)

*Primary Examiner* — William E Dondero
*Assistant Examiner* — Mark K Buse
(74) *Attorney, Agent, or Firm* — Millman IP Inc.

(57) ABSTRACT

In an aspect, the invention relates to a decoupler that is positionable between a shaft (eg. for an alternator) and an endless power transmitting element (eg. a belt) on an engine. The decoupler includes a hub that mounts to the shaft, and a pulley that engages the endless power transmitting element, an isolation spring between the hub and the shaft. The decoupler provides at least a selected damping torque between the hub and the pulley.

8 Claims, 12 Drawing Sheets

(51) Int. Cl.
*F02B 67/06* (2006.01)
*F16D 7/02* (2006.01)
*F16D 41/20* (2006.01)
*F16H 55/36* (2006.01)

(52) U.S. Cl.
CPC .......... *F16D 41/206* (2013.01); *F16H 55/36* (2013.01); *F16H 2055/366* (2013.01); *Y10T 29/49764* (2015.01)

(58) Field of Classification Search
USPC .................................................... 474/70, 94
See application file for complete search history.

(56) References Cited

U.S. PATENT DOCUMENTS

| | | | |
|---|---|---|---|
| 5,156,573 | A | 10/1992 | Bytzek et al. |
| 7,153,227 | B2 * | 12/2006 | Dell et al. ........................ 474/70 |
| 7,591,357 | B2 | 9/2009 | Antchak et al. |
| 7,624,852 | B2 | 12/2009 | Mevissen et al. |
| 7,708,661 | B2 | 5/2010 | Pflug et al. |
| 7,712,592 | B2 * | 5/2010 | Jansen et al. ............... 192/41 S |
| 7,766,774 | B2 * | 8/2010 | Antchak et al. ................. 474/74 |
| 7,972,231 | B2 | 7/2011 | Kawamoto et al. |
| 8,192,312 | B2 | 6/2012 | Ali et al. |
| 8,313,400 | B2 * | 11/2012 | Serkh et al. ..................... 474/74 |
| 9,068,608 | B2 * | 6/2015 | Serkh et al. |
| 2003/0224886 | A1 * | 12/2003 | King et al. ........................ 474/70 |
| 2004/0014540 | A1 * | 1/2004 | Dell et al. ........................ 474/70 |
| 2005/0059518 | A1 * | 3/2005 | Joslyn ........................... 474/135 |
| 2007/0240964 | A1 | 10/2007 | Saito et al. |
| 2007/0254756 | A1 * | 11/2007 | Kawamoto et al. ............ 474/70 |
| 2008/0058140 | A1 * | 3/2008 | Gerring ......................... 474/133 |
| 2008/0058142 | A1 * | 3/2008 | Joslyn ........................... 474/135 |
| 2008/0108442 | A1 * | 5/2008 | Jansen et al. ................... 464/54 |
| 2008/0139351 | A1 | 6/2008 | Pflug et al. |
| 2008/0194339 | A1 * | 8/2008 | Antchak et al. ................ 464/40 |
| 2008/0280709 | A1 | 11/2008 | Gouadec |
| 2008/0280713 | A1 | 11/2008 | Fischer et al. |
| 2008/0312014 | A1 | 12/2008 | Stief et al. |
| 2009/0194380 | A1 | 8/2009 | Ali et al. |
| 2010/0144473 | A1 * | 6/2010 | Ward et al. ..................... 474/112 |
| 2013/0237351 | A1 * | 9/2013 | Marion ............................ 474/70 |

FOREIGN PATENT DOCUMENTS

| | | |
|---|---|---|
| CA | 2740322 A1 | 5/2010 |
| CN | 1890479 A | 1/2007 |
| CN | 101111692 A | 1/2008 |
| DE | 19501685 C1 | 7/1996 |
| DE | 19524403 C2 | 9/2000 |
| DE | 102005008580 A1 | 9/2005 |
| DE | 20205016992 U1 | 2/2006 |
| DE | 202005016992 U1 | 2/2006 |
| EP | 2235400 A4 | 8/2009 |
| WO | 2006045181 A1 | 5/2006 |
| WO | 2007074016 A1 | 7/2007 |
| WO | WO 2007118441 A2 * | 10/2007 ............... F16D 3/66 |
| WO | 2008022897 A1 | 2/2008 |
| WO | 2008067915 A1 | 6/2008 |
| WO | 2008071306 A1 | 6/2008 |
| WO | 2009099504 A3 | 8/2009 |
| WO | 2010037232 A1 | 4/2010 |
| WO | 2010048732 A1 | 5/2010 |
| WO | 2011160202 A1 | 12/2011 |
| WO | 2012061936 A1 | 5/2012 |

OTHER PUBLICATIONS

English Abstract of DE19501685, Espacenet (retrieved Aug. 26, 2015).
English Abstract of DE19524403C2, Espacenet (retrieved Aug. 26, 2015).
English Abstract of DE102005008580A1, Espacenet (retrieved Aug. 26, 2015).
English Abstract of DE202005016992U1, TotalPatent (retrieved Aug. 26, 2015).
Wax Actuators: Is the Wax Actuator Due for a Revival?, 1999, Spartan Peripheral Devices.
Elements Thermostatiques, 2006, Vernet S.A.
Warner Electric PC-500 (specification sheet), Jan. 17, 2008, Warner Electric.
Thermally Activated Linear Actuators, Aug. 5, 2010, Rostra Vernatherm LLC.
Caltherm Thermal Actuators (web page), Oct. 26, 2010, Caltherm Corporation.
Compact Button Cell Actuator (Sample)(web page), Dec. 7, 2010, Therm-Omega Tech Inc.
Written Opinion for PCT/CA2011/01263, dated Feb. 24, 2013, ISA.
International Preliminary Report on Patentability for PCT/CA2011/01263, dated May 14, 2013.
Thermal Actuators: Solid-Liquid Phase Change Actuators (brochure), Date Unknown, Therm-Omega Tech Inc.
Trombetta P613-K Series Throttle Control Kit, Date Unknown, Trombetta Electromagentics.
P/Q Solenoid Families (brochure), Date Unknown, Trombetta Motion Technologies.
Agricultural Equipment Clutch—Dimensions (P-996), Date Unknown, Warner Electric.
Search Report for CN201180054808, dated Jan. 23, 2015, SIPO.
Office Action for CN201180054808, dated Feb. 2, 2015, SIPO.

* cited by examiner

VIBRATION RESPONSE

DAMPING

DECOUPLER WITH TUNED DAMPING AND METHODS ASSOCIATED THEREWITH

CROSS REFERENCE TO RELATED APPLICATIONS

This application is a national phase entry application of PCT/CA2011/001263, filed Nov. 14, 2011, which claims the benefit of: U.S. Provisional Application No. 61/413,475, filed Nov. 14, 2010 and U.S. Provisional Application No. 61/414,682, filed Nov. 17, 2010.

FIELD OF THE INVENTION

The present invention relates to decoupling mechanisms for allowing belt driven accessories to operate temporarily at a speed other than the speed of the belt, and more particularly to decoupling mechanisms for alternators.

BACKGROUND OF THE INVENTION

It is known to provide a decoupling mechanism on an accessory, such as an alternator, that is driven by a belt from the crankshaft of an engine in a vehicle. Such a decoupling mechanism, which may be referred to as a decoupler assembly or a decoupler, permits the associated accessory to operate temporarily at a speed that is different than the speed of the belt. As is known, the crankshaft undergoes cycles of accelerations and decelerations associated with the firing of the cylinders in the engine. The decoupler permits the alternator shaft to rotate at a relatively constant speed even though the crankshaft from the engine, and hence, the pulley of the decoupler, will be subjected to these same cycles of decelerations and accelerations, commonly referred to as rotary torsional vibrations, or torsionals.

Such a decoupler is a valuable addition to the powertrain of the vehicle. However, some engines are harsher on the decoupler than other engines and decouplers on such engines do not last as long as would otherwise be desired. It would be advantageous to provide a decoupler that worked on such engines.

SUMMARY OF THE INVENTION

In an aspect, the invention relates to a decoupler that is positionable between a shaft (eg. for an alternator) and an endless power transmitting element (eg. a belt) on an engine. The decoupler includes a hub that mounts to the shaft, and a pulley that engages the endless power transmitting element, an isolation spring between the hub and the shaft. The decoupler provides at least a selected damping torque between the hub and the pulley.

The damping torque may be selected to provide less than a selected maximum amount of torsional vibration to the hub of the decoupler particularly in a selected frequency range. In particular providing less than the selected maximum amount of torsional vibration to the hub of the decoupler in the selected frequency range is useful when the decoupler is connected to a shaft of an alternator. It has been found that this inhibits the voltage regulator of the alternator from controlling the alternator at a switching frequency that is in the range of 15 Hz, which may be near the natural frequency of the decoupler. Inhibiting the alternator from having such a switching frequency reduces any torsional vibration induced in the hub from the alternator, in that frequency range. This reduces the overall torsional vibration incurred by the hub, which improves the fatigue life of the isolation spring.

Through significant testing it has been found that the voltage regulator of the alternator may be upset by current fluctuations that result from first order vibrations that are incurred by the alternator rotor. When this occurs, the voltage regulator itself may switch to a switching frequency in the range of about 15 Hz. When it does this, it generates a vibration in the alternator rotor that it transmitted back into the hub of the decoupler. Because this frequency is near the natural frequency of the decoupler the hub may respond with a significantly increased amplitude of vibration (i.e. the hub will reciprocate through a higher angular range). This increased angular range of reciprocation can significantly increase the stressed on the isolation spring in the decoupler and thereby reduce its fatigue life. By damping the vibrations from the engine, and in particular the first order vibrations so that they are attenuated by a selected amount before reaching the hub (and therefore before they reach the alternator rotor) the voltage regulator is less likely to respond to the current fluctuations generated thereby with a switching frequency in the 15 Hz range. Thus the voltage regulator will have a reduced tendency of feeding more vibration back into the alternator rotor and the hub of the decoupler at frequencies near the natural frequency of the hub.

In a particular embodiment, the decoupler includes, a hub, a pulley, an isolation spring, a first friction surface, a second friction surface and a retainer. The hub is adapted to be coupled to the shaft such that the shaft co-rotates with the hub about a rotational axis. The pulley is rotatably coupled to the hub and has an outer periphery that is adapted to engage the endless power transmitting element. The isolation spring is positioned to transfer rotational force from the pulley to the hub and to accommodate torsional vibration between the pulley and the hub. The first friction surface is operatively connected with the pulley. The second friction surface is operatively connected with the hub. The friction surface biasing member is positioned for exerting a biasing force to biasing the first and second friction surfaces against each other. The retainer is engaged with the friction surface biasing member and positioned to cause the friction surface biasing member to apply at least a selected biasing force on the first and second friction surfaces thereby generating at least a selected damping torque during relative rotational movement between the pulley and the hub.

The damping structure biasing member may be a Belleville washer, which may have any suitable number of waves to suit the application. Alternatively, the damping structure biasing member may be a helical compression spring. As a further alternative, the damping structure biasing member may be one of a plurality of helical compression springs. In such an alternative embodiment, the damping structure may further include a support member that has the friction member on one side and a plurality of blind apertures or other spring supports on the other side for receiving and supporting the compression springs, such that the plurality of damping structure biasing members each are positioned independently of one another to urge the friction member in parallel with one another. In another alternative embodiment, a plurality of damping structure biasing members could be arranged in series with one another (e.g. end-to-end).

In an aspect, the invention relates to a test decoupler for use in helping to produce a production decoupler. The test decoupler is positionable between a shaft (eg. for an alternator) and an endless power transmitting element (eg. a belt) on an engine or on a test setup intended to simulate an engine. The test decoupler includes a hub that mounts to the shaft, and a pulley that engages the endless power transmitting element, an isolation spring between the hub and the shaft. The test decoupler is capable of adjusting the amount of damping torque it produces between the hub and the pulley. In this way it can be used to help determine a suitable damping torque to provide in the production decoupler.

In an embodiment, the test decoupler includes, a hub, a pulley, an isolation spring, a first friction surface, a second friction surface and a retainer. The hub is adapted to be coupled to the shaft such that the shaft co-rotates with the hub about a rotational axis. The pulley is rotatably coupled to the hub and has an outer periphery that is adapted to engage the endless power transmitting element. The isolation spring is positioned to transfer rotational force from the pulley to the hub and to accommodate torsional vibration between the pulley and the hub. The first friction surface is operatively connected with the pulley. The second friction surface is operatively connected with the hub. The friction surface biasing member is positioned for exerting a biasing force to biasing the first and second friction surfaces against each other. The retainer is engaged with the friction surface biasing member. The position of the retainer controls the biasing force of the friction surface biasing member. The retainer is adjustable in position.

In another aspect, the invention is directed to a method of producing a production decoupler for an engine, comprising:
a) providing resonance data associated with the engine;
b) determining using software an approximate damping torque to provide a selected amount of damping between a hub and a pulley of the production decoupler based on the resonance data provided in step a);
c) providing a test decoupler that is capable of providing an adjustable damping torque including the approximate damping torque determined in step b);
d) selecting a final damping torque to be provided by the production decoupler by applying torsional vibrations on the test decoupler, based on the resonance data of step a); and
e) producing the production decoupler that includes a production hub that is adapted to be coupled to a shaft such that the shaft co-rotates with the hub about a rotational axis, a pulley rotatably coupled to the hub and having an outer periphery that is adapted to engage an endless power transmitting element driven by the engine, and an isolation spring positioned to transfer rotational force from the pulley to the hub and to accommodate torsional vibration between the pulley and the hub, wherein the production decoupler applies at least the final damping torque between the production hub and the production pulley.

BRIEF DESCRIPTION OF THE DRAWINGS

The present invention will now be described by way of example only with reference to the attached drawings, in which.

DETAILED DESCRIPTION OF THE INVENTION

Figure 1:
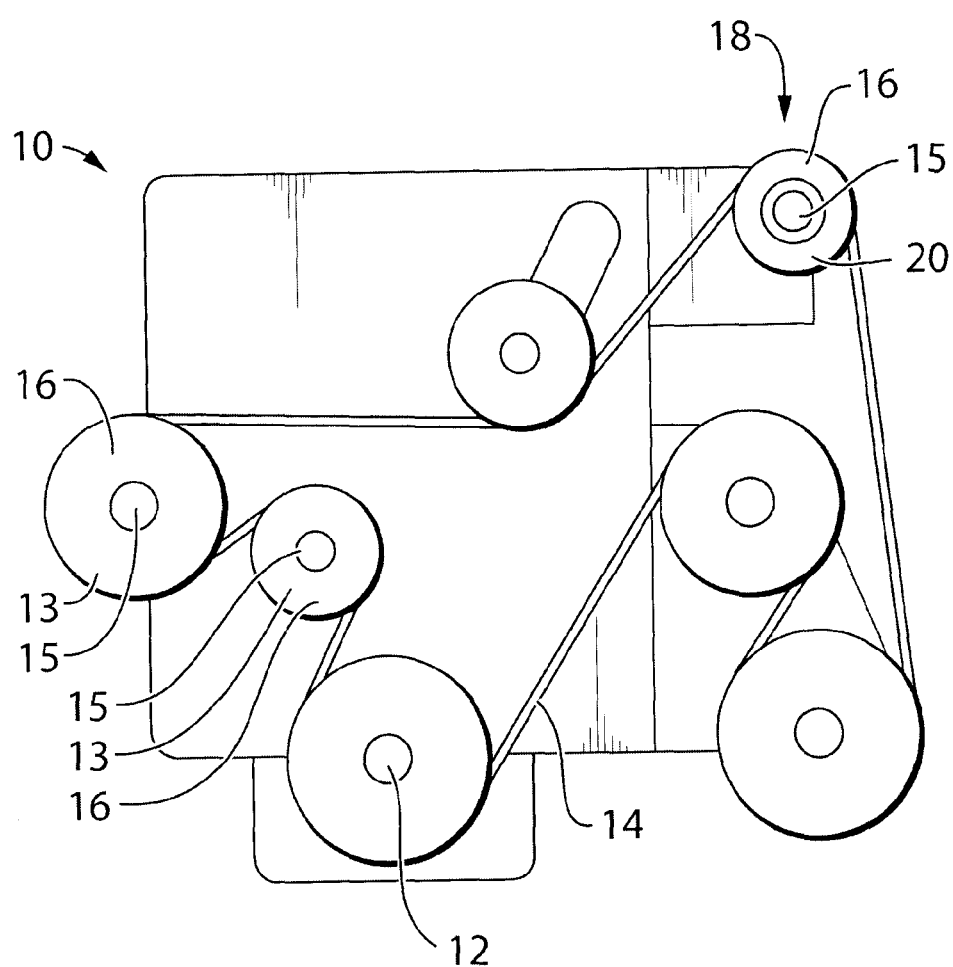
FIG. 1 is an elevation view of an engine with a plurality of belt driven accessories, one of which has a decoupler in accordance with an embodiment of the present invention.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16 (shown in dashed outlines), such as an alternator 18. Each accessory 16 includes an input drive shaft 15 with a pulley 13 thereon, which is driven by the belt 14. A decoupler 20 is provided instead of a pulley, between the belt 14 and the input shaft 15 of any one or more of the belt driven accessories 16, an in particular the alternator 18.

Figure 2:
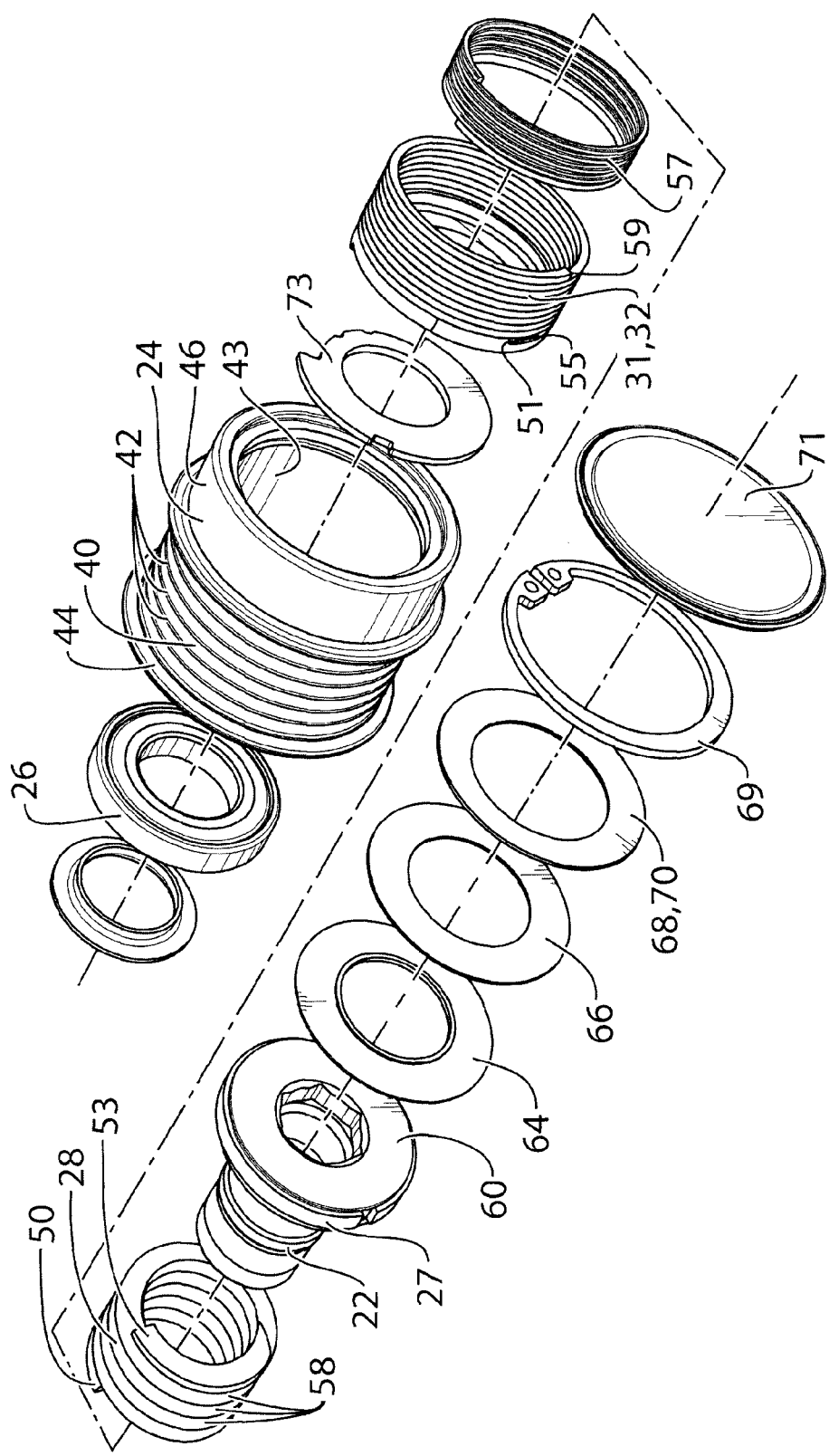
FIG. 2 is an exploded perspective view of the decoupler shown in FIG. 1.

Reference is made to FIG. 2, which shows a sectional view of the decoupler 20. The decoupler 20 includes a hub 22, a pulley 24, a first bearing member 26, a second bearing member 27, an isolation spring 28, a carrier 30, and a one-way clutch 31, which in this exemplary embodiment is a one-way wrap spring clutch comprising a wrap spring 32.

The hub 22 may be adapted to mount to the accessory shaft 15 (FIG. 1) in any suitable way. For example, the hub 22 may have a shaft-mounting aperture 36 therethrough that is used for the mounting of the hub 22 to the end of the shaft 15, for co-rotation of the hub 22 and the shaft 15 about an axis A.

The pulley 24 is rotatably coupled to the hub 22. The pulley 24 has an outer surface 40 which is configured to engage the belt 14. The outer surface 40 is shown as having grooves 42. The belt 14 may thus be a multiple-V belt. It will be understood however, that the outer surface 40 of the pulley 24 may have any other suitable configuration and the belt 14 need not be a multiple-V belt. For example, the pulley 24 could have a single groove and the belt 14 could be a single V belt, or the pulley 24 may have a generally flat portion for engaging a flat belt 14. The pulley 24 further includes an inner surface 43, which the wrap spring 32 may engage in order to couple the pulley and hub 22 together. The pulley 24 may be made from any suitable material, such as a steel, or aluminum, or in some cases a polymeric material, such as certain types of nylon, phenolic or other materials.

The first bearing member 26 rotatably supports the pulley 24 on the hub 22 at a first (proximal) axial end 44 of the pulley 24. The first bearing member 26 may be any suitable type of bearing member, such as a bushing made from nylon-4-6 or for some applications it could be PX9A which is made by DSM in Birmingham, Mich., USA, or some other suitable polymeric material, and may be molded directly on the pulley 24 in a two step molding process in embodiments wherein a molded pulley is provided. It may be possible to use a bearing (e.g. a ball bearing) as the first bearing member 26 instead of a bushing. In such a case, the bearing could be inserted into a mold cavity and the pulley 24 could be molded over the bearing 26. Instead of a bearing, a metallic (e.g. bronze) bushing may be provided, which can be inserted into a mold cavity for the pulley molding process in similar fashion to the aforementioned bearing.

The second bearing member 27 is positioned at a second (distal) axial end 46 of the pulley 24 so as to rotatably support the pulley 24 on a pulley support surface 48 of the hub 22. The second bearing member 27 may mount to the pulley 24 and to the hub 22 in any suitable ways. In the embodiment shown, the second bearing member 27 may be molded around the pulley support surface 48 by an injection molding process wherein the hub 22 forms part of the mold. The hub 22 may have a coating thereon prior to insertion into the mold cavity, to prevent strong adherence of the bearing member 27 to the pulley support surface 48 during the molding process, so that after removal of the hub 22 and bearing member 27 from the molding machine (not shown), the bearing member 27 can rotate about the hub 22. The bearing member 27 may be press-fit into a seat 49 on the pulley 24, and may be welded (e.g. laser welded) with the pulley 24 in embodiments wherein the pulley 24 is made from a suitable polymeric material. In such instances, the material of the pulley 24 and the material of the first bearing member 26 are selected so as to be compatible for joining by whatever suitable joining process is selected, such as laser welding. It will be noted that other ways of joining the second bearing member 27 and the pulley 24 may be employed, such as adhesive bonding, and/or using mechanical joining elements (e.g. resilient locking tabs) that would lock the bearing member 27 to the pulley.

The isolation spring 28 is provided to accommodate oscillations in the speed of the belt 14 relative to the shaft 15. The isolation spring 28 may be a helical torsion spring that has a first helical end 50 that is held in an annular slot and that abuts a radially extending driver wall 52 (FIG. 3) on the carrier 30. The isolation spring 28 has a second helical end 53 (FIG. 2) that engages a similar driver wall (not shown) on the hub 22. In the embodiment shown, the isolation spring 28 has a plurality of coils 58 between the first and second ends 50 and 53. The coils 58 are preferably spaced apart by a selected amount and the isolation spring 28 is preferably under a selected amount of axial compression to ensure that the first and second helical ends 50 and 53 of the spring 28 are abutted with the respective walls on the carrier 30 and hub 22. An example of a suitable engagement between the isolation spring 28, the hub 22 and the carrier 30 is shown and described in U.S. Pat. No. 7,712,592, the contents of which are incorporated herein by reference. A thrust plate 73 may be provided to receive the axial thrust force of the carrier 30 resulting from the axial compression of the spring 28.

The isolation spring 28 may be made from any suitable material, such as a suitable spring steel. The isolation spring 28 may have any suitable cross-sectional shape. In the figures, the isolation spring 28 is shown as having a generally rectangular cross-sectional shape, which provides it with a relatively high torsional resistance (i.e. spring rate) for a given occupied volume. However, a suitable spring rate may be obtained with other cross-sectional shapes, such as a circular cross-sectional shape or a square cross-sectional shape.

Alternatively, the isolation spring 28 may be compression spring. As a further alternative, the isolation spring 28 may be one of two or more isolation springs, each of which is a compression spring. Such a configuration is shown in U.S. Pat. No. 7,708,661 and US Patent application publication no. 2008/0312014, PCT publication no. 2007/074016, PCT publication no. 2008/022897, PCT publication no. 2008/067915, and PCT publication no. 2008/071306, all of which are hereby incorporated by reference in their entirety.

In the embodiment shown in FIG. 2, a sleeve 57 is provided between the isolation spring 28 and the clutch spring 32. The sleeve 57 is, in the embodiment shown, a helical member itself, although it could have any other suitable configuration such as a hollow cylindrical shape. The sleeve 57 acts as a torque limiter by limiting the amount of room available for radial expansion of the isolation spring 28 (in embodiments wherein the isolation spring 28 is a torsion spring). Thus when a torque is provided by the pulley 24 that exceeds a selected limit, the isolation spring 28 expands until it is constrained by the sleeve 57. An example of a suitable sleeve 57 is shown and described in U.S. Pat. No. 7,766,774, the contents of which are hereby incorporated by reference.

The helical clutch spring 32 has a first end 51 that is engageable with a radial wall 55 of the carrier 30 and that may be fixedly connected to the carrier 30. The helical clutch spring 32 has a second end 59 that may be free floating.

The carrier 30 may be made from any suitable material such as, for example, a suitable nylon or the like.

When a torque is applied from the belt 14 to the pulley 24 to drive the pulley 24 at a speed that is faster than that of the shaft 15, friction between the inner surface 43 of the pulley 24 and the coils of the clutch spring 32 drives at least one of the coils of the clutch spring 32 at least some angle in a first rotational direction about the axis A, relative to the first end 51 of the clutch spring 32. The relative movement between the one or more coils driven by the pulley 24 relative to the first end 51 causes the clutch spring to expand radially, which further strengthens the grip between the coils of the clutch spring 32 and the inner surface 43 of the pulley 24. As a result, the first end 59 of the clutch spring 32 transmits the torque from the pulley to the carrier 30. The carrier 30 transmits the torque to the hub 22 through the isolation spring 28. As a result, the hub 22 is brought up to the speed of the pulley 24. Thus, when the pulley 24 rotates faster than the hub 22, the clutch spring 32 operatively connects the pulley 24 to the carrier 30 and therefore to the hub 22.

Figure 3:
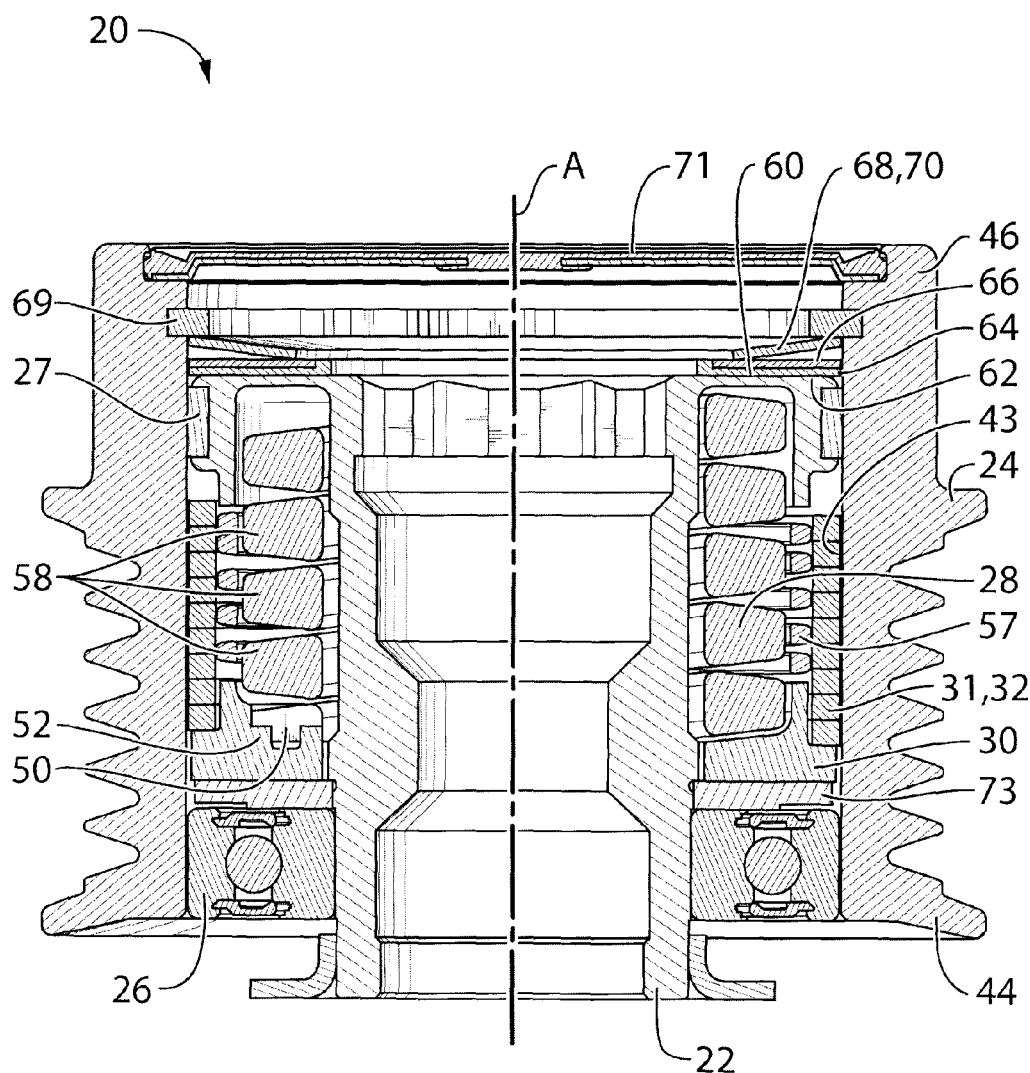
FIG. 3 is a magnified sectional view of the decoupler shown in FIG. 2.
Figure 4:
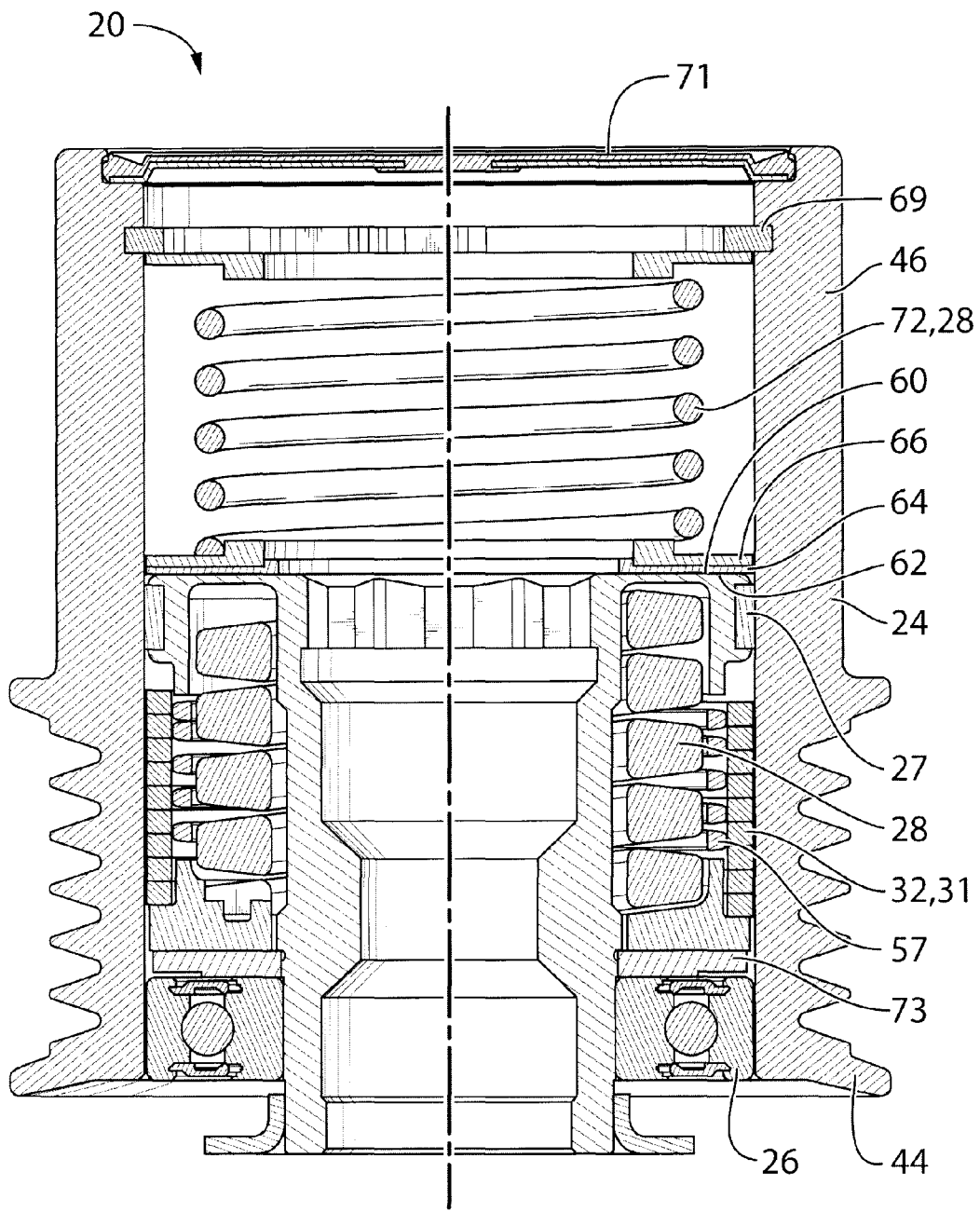
FIG. 4 is a magnified sectional view of a variant of the decoupler shown in FIG. 2.
Figure 5:
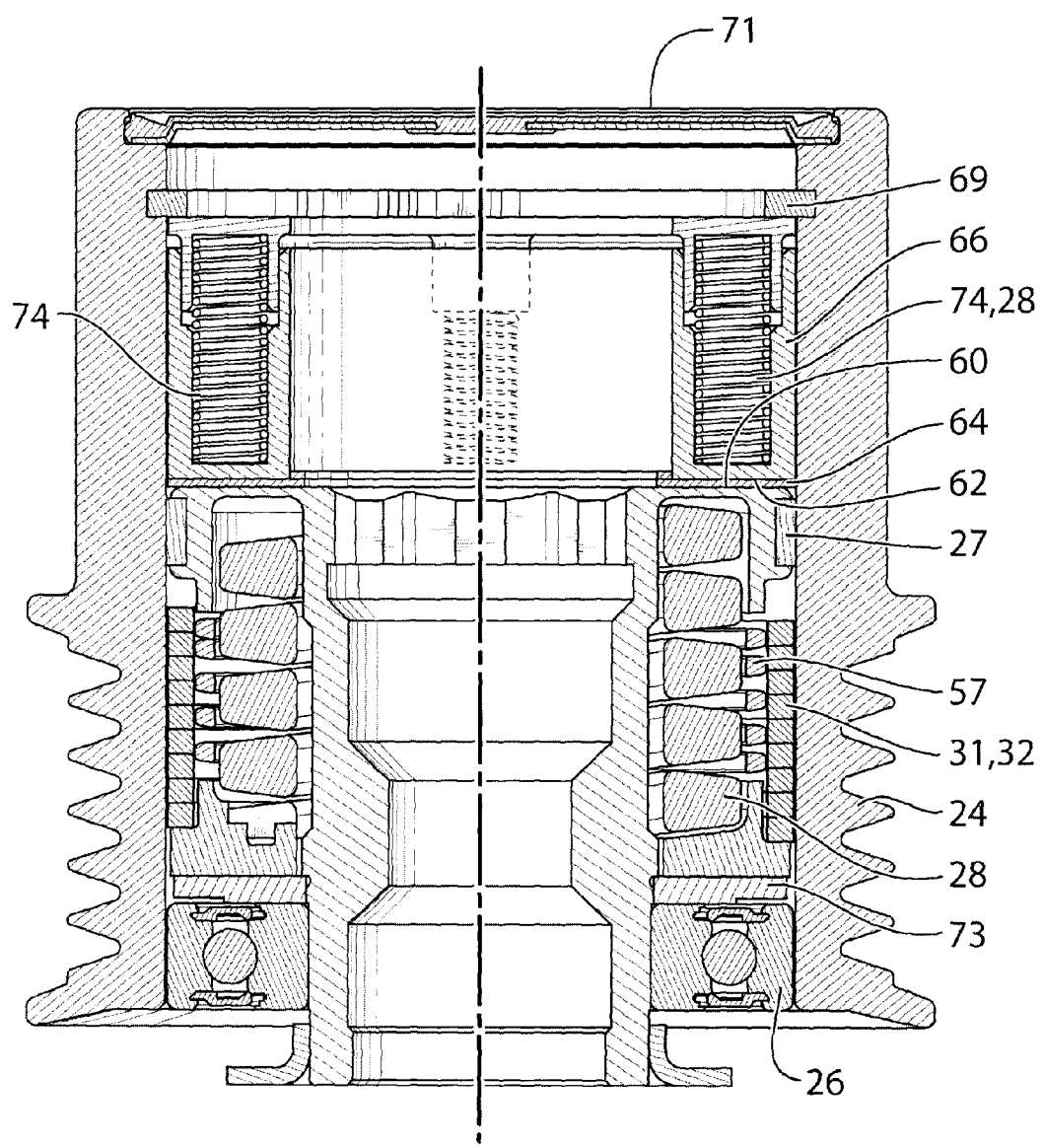
FIG. 5 is a magnified sectional view of another variant of the decoupler shown in FIG. 2.
Figure 6:
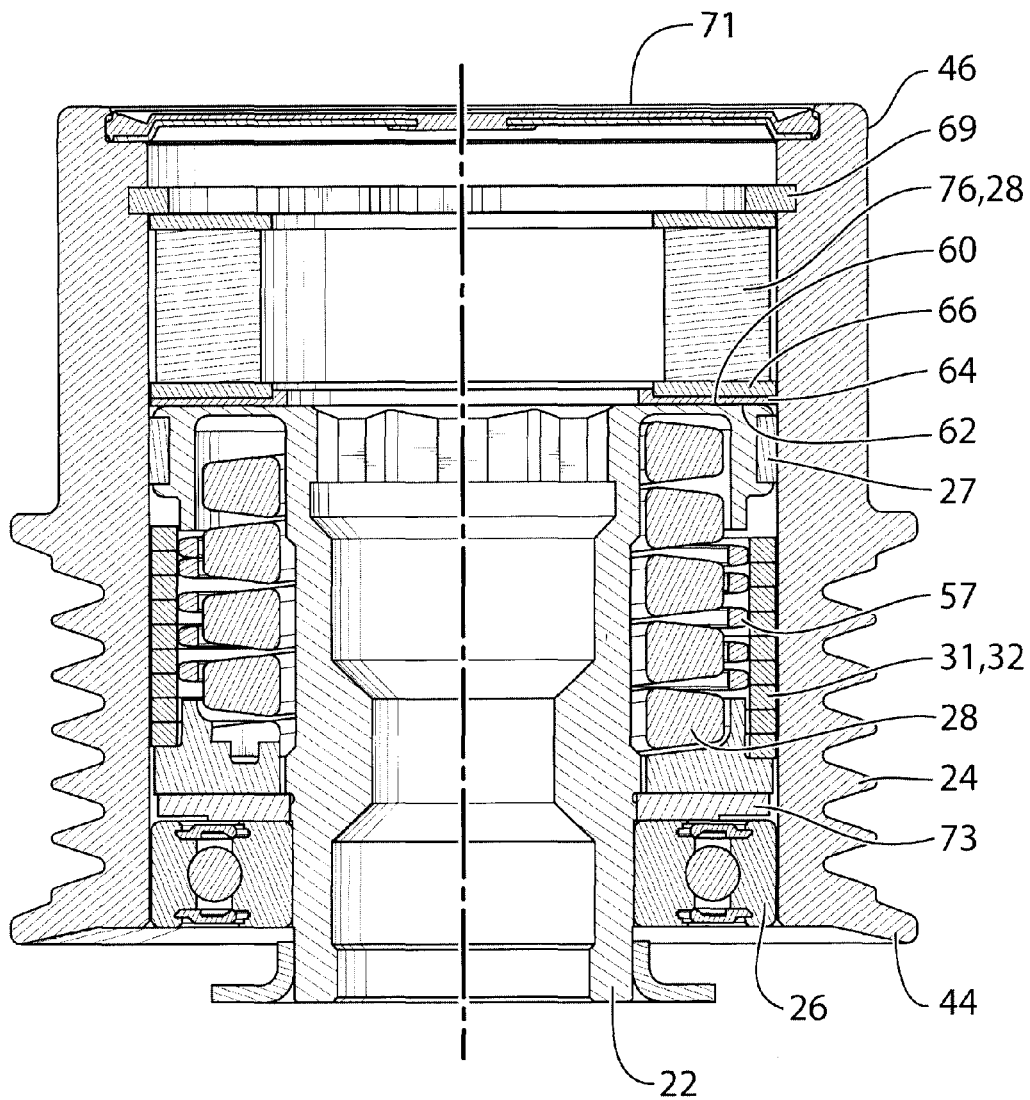
FIG. 6 is a magnified sectional view of another variant of the decoupler shown in FIG. 2.

At the distal end of the hub 22 is a first friction surface 60 that engages a second friction surface 62 on a friction member 64. The friction member 60 is operatively connected to the hub 22 (in this particular instance it is directly on the hub 22). The friction surface 62 is operatively connected to the pulley 24. In this exemplary embodiment it is on the friction member 64, which is adjacent to and axially and rotationally coupled to a thrust washer 66. A friction surface biasing member 68 is engaged axially and rotationally with the thrust washer 66 and is retained in place by a retainer member 69, and a seal cap 71 is provided to cover the distal end to prevent intrusion of dirt and debris into the interior space of the decoupler 20. The biasing member 68 urges the friction surfaces 60 and 62 into engagement with each other with a selected force. This selected force directly affects the frictional force that the friction surfaces 60 and 62 exert on each other. The biasing member 68 in FIGS. 2 and 3 is a Belleville washer 70. However, it will be understood that other types of biasing member could be used, such as for example, a helical compression spring 72 as shown in FIG. 4, a plurality of compression springs 74 as shown in FIG. 5, or a monolithic elastomeric biasing member 76 as shown in FIG. 6. Each of the friction member 64, the thrust member 66, the biasing member 68 and the retainer 69 may be fixed rotationally with the pulley 24 by any suitable means. For example, they may each have a radial protrusion that extends into an axially extending slot in the pulley 24. It will also be noted that in the embodiments shown in FIGS. 4, 5 and 6 there is an additional thrust plate (not numbered) between the retainer 69 and the biasing member 68 to assist with the distribution of force between them.

In each of these embodiments, the biasing member 68 is positioned so that a selected normal force is applied on the friction surfaces 60 and 62. Additionally, the materials that make up the first and second friction surfaces 60 and 62 and the surface finishes provided on these surfaces 60 and 62 are selected so that these surfaces have a selected coefficient of friction. By providing a selected coefficient of friction between the surfaces 60 and 62 and by providing a selected normal force, a selected frictional force is exerted on the hub 22.

In the particular embodiment shown, the friction member 64 is engaged with the hub 22 directly. It is possible for the friction member 64 to engage the hub 22 indirectly (e.g. through engagement with a friction surface on another member that is itself connected directly to the hub 22).

The selected frictional force may be referred to as a selected damping force, which exerts a selected damping torque on the hub 22. The purpose of this selected damping torque is described below.

When an engine, such as engine 10, operates it is well known that the crankshaft speed oscillates between high and low values about a mean speed. The mean speed of the crankshaft 12 depends, of course, on the RPM of the engine. The speed variations of the crankshaft are an inherent property of internal combustion engines due to the firing of the cylinders, which generates linear motion in the pistons, which is transferred to the crankshaft 12 via connecting rods. These speed variations of the crankshaft 12 are transferred to the crankshaft pulley, from the crankshaft pulley into the belt 14, and from the belt 14 to the decoupler pulley 24.

For a 4-cylinder engine the crankshaft 12 (and therefore the decoupler pulley 24) undergo second-order vibrations. That is to say, the frequency of the vibration of the pulley 24 is the speed of the engine×the number of cylinders/2. Thus, for a 4-cylinder engine at idle (e.g. about 750 RPM), the decoupler pulley 24 undergoes vibration at 750 rotations/minute×1 minute/60 seconds×4/2=25 Hz.

Figure 7A:
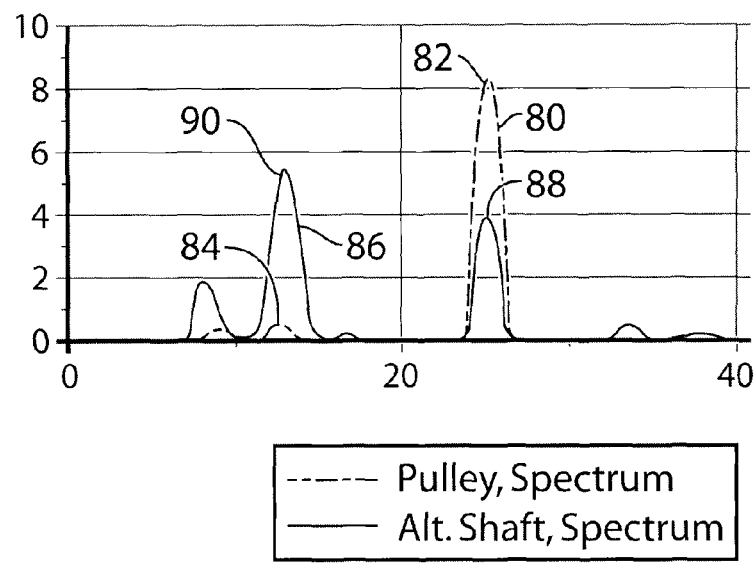
FIG. 7a is a graph showing the vibration response of the pulley and hub from the decoupler of FIG. 1 over a range of frequencies.
Figure 7B:
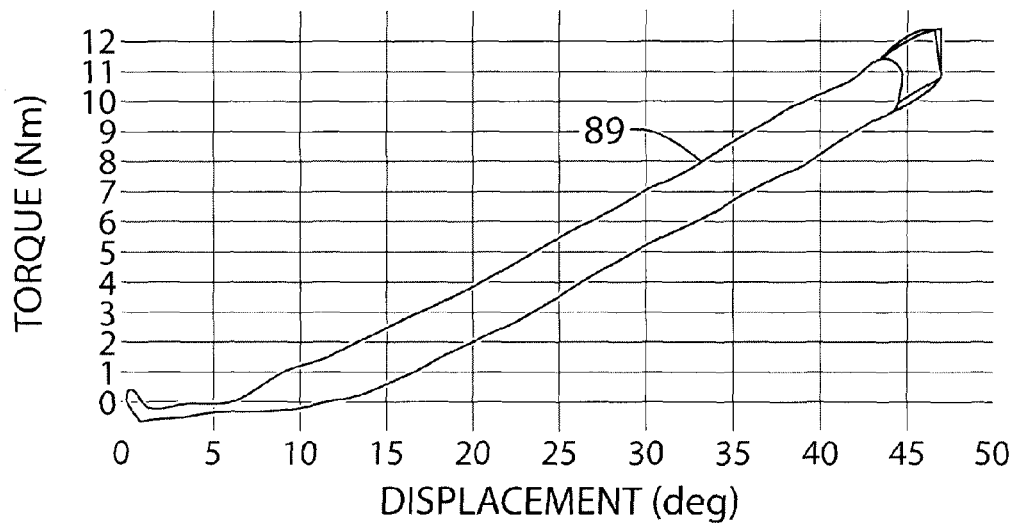
FIG. 7b is a graph showing the torque response of the decoupler of FIG. 1 in relation to relative displacement between the pulley and hub.

Reference is made to FIGS. 7a and 7b, which show test results from a test performed on a test bench configured to simulate the driving of the alternator 18 through a front engine accessory drive of the type that is commonly employed in vehicles, that is driven by a 4-cylinder engine at idle. Referring to FIG. 7a, the curve shown at 80 represents the amount of angular oscillation that the pulley 24 undergoes in relation to frequency. As can be seen, and as expected, at a frequency of about 25 Hz, there is a peak 82 in the curve 80 indicative of a vibration of about 8 degrees peak-to-peak. One can observe, however, that there is a (much smaller) peak shown at 84 at about 12.5 Hz indicative of a pulley vibration of less than a degree peak-to-peak. This is an unexpected first order vibration, which may be due to several factors, such as an imbalance in the crankshaft or some other component in the FEAD system. An additional cause of such first order vibrations however, occurs particularly in diesel engines. To optimize catalytic converter function, such engines may alternate between rich and lean firings. This generates a torque pulse twice per cycle on a 4-cylinder, which means once per rotation of the crankshaft. This is therefore a first order vibration.

The curve shown at 86 in FIG. 7a represents the amount of angular oscillation that the hub 22 undergoes in relation to frequency. As expected, there is a peak 88 at about 25 Hz that is the result of the pulley oscillation at 25 Hz. The amplitude of the oscillations at 25 Hz is about 4 degrees peak-to-peak. This is expected given the approximate diameter ratio of the pulley 24 to the hub 22. However, it can be seen that there is also a peak 90 at the first order frequency (i.e. 12.5 Hz in this case). This peak 90 shows that very small vibrations at the pulley 24 (i.e. less than 1 degree) result in unexpectedly large vibrations at the hub 22 (about 5.5 degrees peak-to-peak).

Further analysis revealed that what appears to be occurring is that the alternator's voltage regulator, changes its switching frequency in certain situations to a frequency that is in the range of about 15 Hz. The voltage regulator controls the voltage output of the alternator 18, keeping the voltage constant regardless of changes in engine speed (and therefore alternator rotor speed) and electrical load. To carry this out, the voltage regulator cyclically activates and deactivates the voltage at the excitation windings thereby controlling the ratio of on time to off time so as to adjust the output voltage based on the voltage generated in the alternator. The voltage regulator is controlled based on a number of inputs, and as such a number of situations can affect the actions of the voltage regulator. For example, rotor speed fluctuation can cause fluctuations in the current generated by the alternator. This can cause the voltage regulator to change (drop) the switching frequency to compensate for the fluctuating current.

This effect on the voltage regulator is particularly strong when there are first order vibrations transferred into the decoupler 20 from the engine 10. When exposed to these first order vibrations in particular the voltage regulator may react by changing the switching frequency to a frequency in the range of about 15 Hz.

The switching of the voltage regulator causes a certain amount of torsional vibration in the alternator rotor and shaft, which is transferred into the hub 22 of the decoupler 20. Thus, the oscillations that result in the hub 22 are partly caused by the oscillations in the pulley 24 and partly caused by the oscillations in the alternator shaft (shown at 94 in FIG. 1). It will be noted that the decoupler 20 may have a natural resonance frequency that is somewhere in the range of about 5 Hz to about 20 Hz, or more precisely from about 12 Hz to about 15 Hz. Vibrational inputs to the hub 22 that are near the natural resonance frequency of the decoupler 20 can become magnified. As noted above, the switching frequency of the voltage regulator may be in the range of 15 Hz in some situations when the voltage regulator is affected by the fluctuations in the rotor speed. Thus the hub 22 can be subjected to torsional vibrations from the alternator shaft at a frequency that is near the natural frequency of the decoupler 20. Also as noted above, there can be first order vibrations (which are near the natural frequency of the decoupler 20 when the engine is at idle) which are transmitted to the pulley 24 and through to the hub 22, which are the result of imbalances in the crankshaft 12 and the like.

The amount of damping torque provided in the exemplary decoupler 20 whose performance is shown in FIG. 7a is here is 0.29 in overrunning mode (i.e. when the hub 22 overruns the pulley 24). In non-overrunning mode the damping torque is half of the difference in the upper and lower portions of the torque curve shown at 89 in FIG. 7b.

The torsional vibrations at the hub 22 that are near the natural frequency of the decoupler 20 and which therefore may get magnified can impact the operating life of the decoupler 20, and in particular the operating life of the isolation spring 28. The particular amount of torsional vibration that would be considered acceptable will vary from application to application. It is possible that the operating life of the decoupler 20 may be considered to be acceptable even though there is a 5.5 degrees peak-to-peak oscillation when the engine is at idle. It depends of course on many factors, such as the material of construction of the components that make up the decoupler 20, and the number of operational cycles that would constitute an acceptable operating life. The operating life may, however, be considered too short. It has been determined that a way of extending the operating life of the decoupler 20 is to reduce the amplitude of vibration of the hub 22.

Thus, it is possible when designing the decoupler to start by selecting a suitable operating life for it, then to decide what maximum amplitude of vibration in the hub 22 is acceptable. The amplitude of vibration can be controlled via damping. The amount of damping that is required may be established empirically, by running mathematical models, or by any other suitable method. In an embodiment, the mathematical models would be run first. The results from those models could be used to produce a test decoupler that is capable of adjustable damping. This test decoupler is shown at 100 in FIG. 8. This test decoupler 100 may have many components similar to those on the decoupler 10 shown in FIG. 2, such as a hub 122, a pulley 124, an isolation spring 128, a wrap spring 132, a sleeve 157, bearing members 126 and 127, a thrust member 166, a friction member 164 with a friction surface 162 thereon for engagement with friction surface 160 on the hub 122, and may further include some additional structure. For example, the decoupler 100 includes a biasing member 102 that is made up of a plurality of Belleville washers 70. Furthermore, the retainer, shown at 104 is axially adjustable in position by means of a threaded exterior surface 106 on the retainer 104, that mates with a threaded surface 107 on the pulley shown at 124. The threaded surfaces 106 and 107 also provide structure with which the retainer 104 is held in whatever position it is adjusted to. By providing the test decoupler 100, the damping torque applied in the decoupler 100 can be easily set to the value determined by the mathematical models, and can then be adjusted up or down quickly in situ if it is determined that the oscillations are too large. The oscillations can be measured during testing using a number of different types of sensor that can provide precise information relating to the angular position of the pulley 124 and the hub, shown at 22. For example, the 2SA-10 Sentron sensor manufactured by Sentron AG, Baarerstrasse 73, 6300 Zug, Switzerland is a suitable sensor that can be used to measure the torsional vibrations. Use of such a sensor to measure torsional vibrations is described in PCT publication WO2006/045181 the contents of which are incorporated herein by reference. The sensor for the pulley 124 is shown at 108 and the sensor for the hub 122 is shown at 110. Sensor 110 is shown at the opposite end of alternator shaft 15 (i.e. at the opposite end to the end that the decoupler 100 is mounted to).

A controller 111 may be provided to receive signals from the sensors 108 and 110 and can indicate to an operator what the torsional vibrations are. The operator can then adjust the position of the retainer 104 on the decoupler 100 to increase or decrease the damping force until the torsional vibrations at the hub 122 are below the determined limit (i.e. are below the maximum amplitude of vibration calculated for the desired operating life). Alternatively the system could be automated so that the controller 111 controls the retainer 104 and positions it as necessary to achieve less than a selected torsional vibration at the hub 122.

Figure 9:
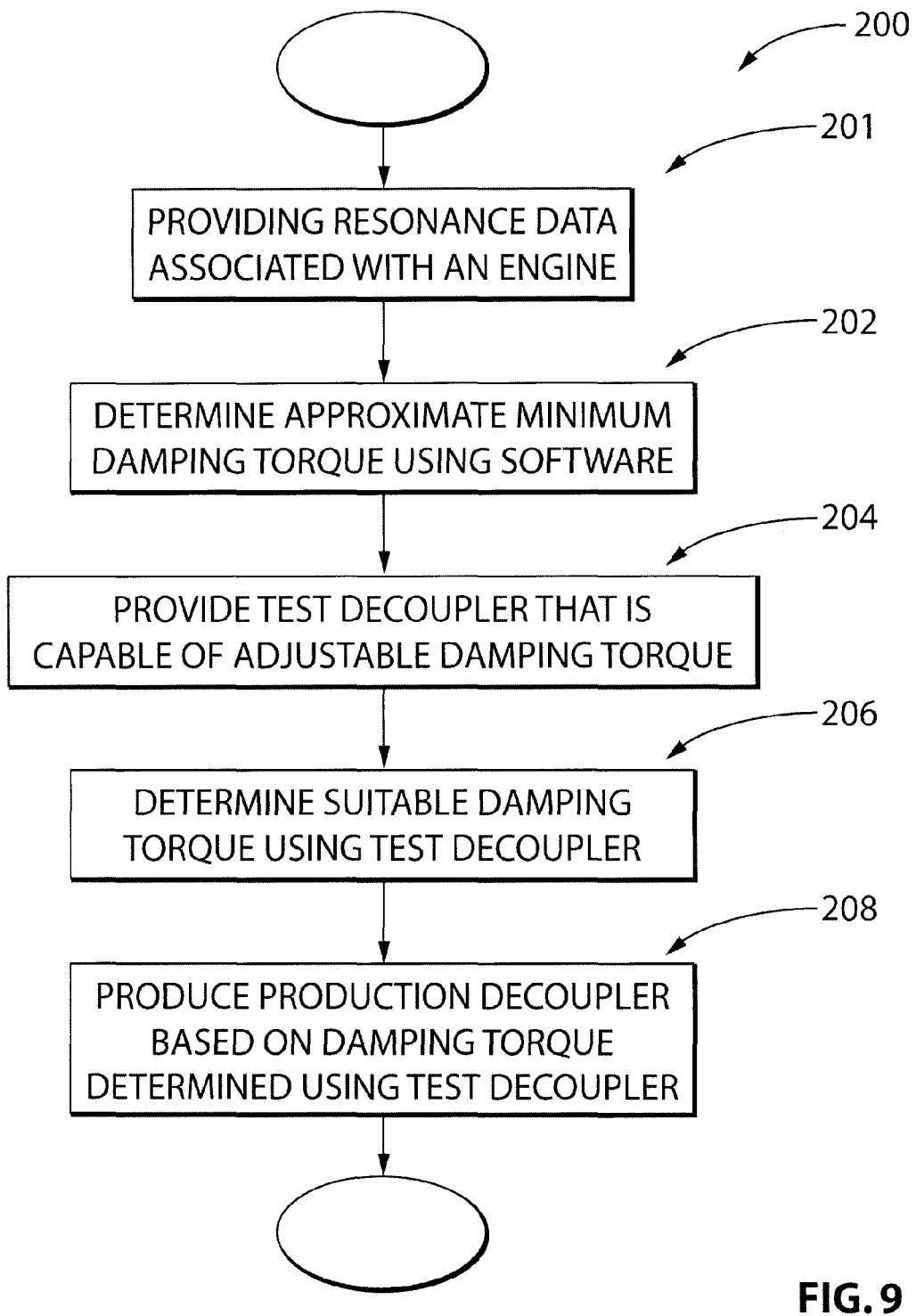
FIG. 9 is a flow diagram of a method of producing a decoupler, in accordance with another embodiment of the invention.

This test decoupler 100 may be used to assist in carrying out a method of producing the production decoupler 20. The method includes:

a) providing resonance data associated with the engine;

b) determining using software an approximate damping torque to provide a selected amount of damping between a hub and a pulley of the production decoupler 20 based on the resonance data provided in step a);

c) providing a test decoupler (i.e. the test decoupler 100) that is capable of adjustable damping torque;

d) determining a suitable damping torque for use with the production decoupler 20 using the test decoupler 100, based on the approximate damping torque determined in step b); and e) producing the production decoupler 20 with a production hub 22, a production pulley 24, a production friction member 64 and a production biasing member 68 that is positioned and held to generate a biasing force on the friction member 64 so that the friction member 64 provides at least the suitable damping torque between the hub 22 and the pulley 24. These steps are shown at 201, 202, 204, 206 and 208 respectively in the flow diagram shown in FIG. 9, relating to a method 200. It will be noted that it is at least conceivable that step b) could be omitted, and that step d) could be carried out simply by progressively increasing the damping torque until a selected result is observed. For example, the damping torque can be increased until any torsional vibration observed in the hub 122 is less than a selected level.

In step a), providing the resonance data may be achieved by receiving the resonance data from a manufacturer of the engine, or alternatively by receiving an example engine from the manufacturer and testing it and measuring the resonance. Providing the resonance data may also be carried out as follows. A customer (eg. an engine manufacturer) initially gives the entity that is manufacturing the decoupler 20 (which may simply be referred to as 'the entity'), some preliminary engineering data related to the inertia of various components on the engine relating to the drive of the endless power transmitting element. Also the customer may give the entity projected loads and load profiles (steady frictional load, or periodic pulsating load) of each component and information regarding the endless power transmitting element, such as belt stiffness if it is a belt. The entity takes the data and conducts a preliminary analysis using software such as a simulation program. The preliminary analysis results in an initial design for the production decoupler 20 including an approximate spring rate for the production isolation spring 28 for reducing the severity of the resonances described by the resonance data, a maximum permissible angular vibration in order to maintain a minimum fatigue life for the isolation spring 28, and a prediction of an approximate damping torque that needs to be provided by the production decoupler 20 to achieve the desired fatigue life. Several design iterations may be traded back and forth between the customer and the entity during the process of designing and building a prototype engine.

Figure 8:
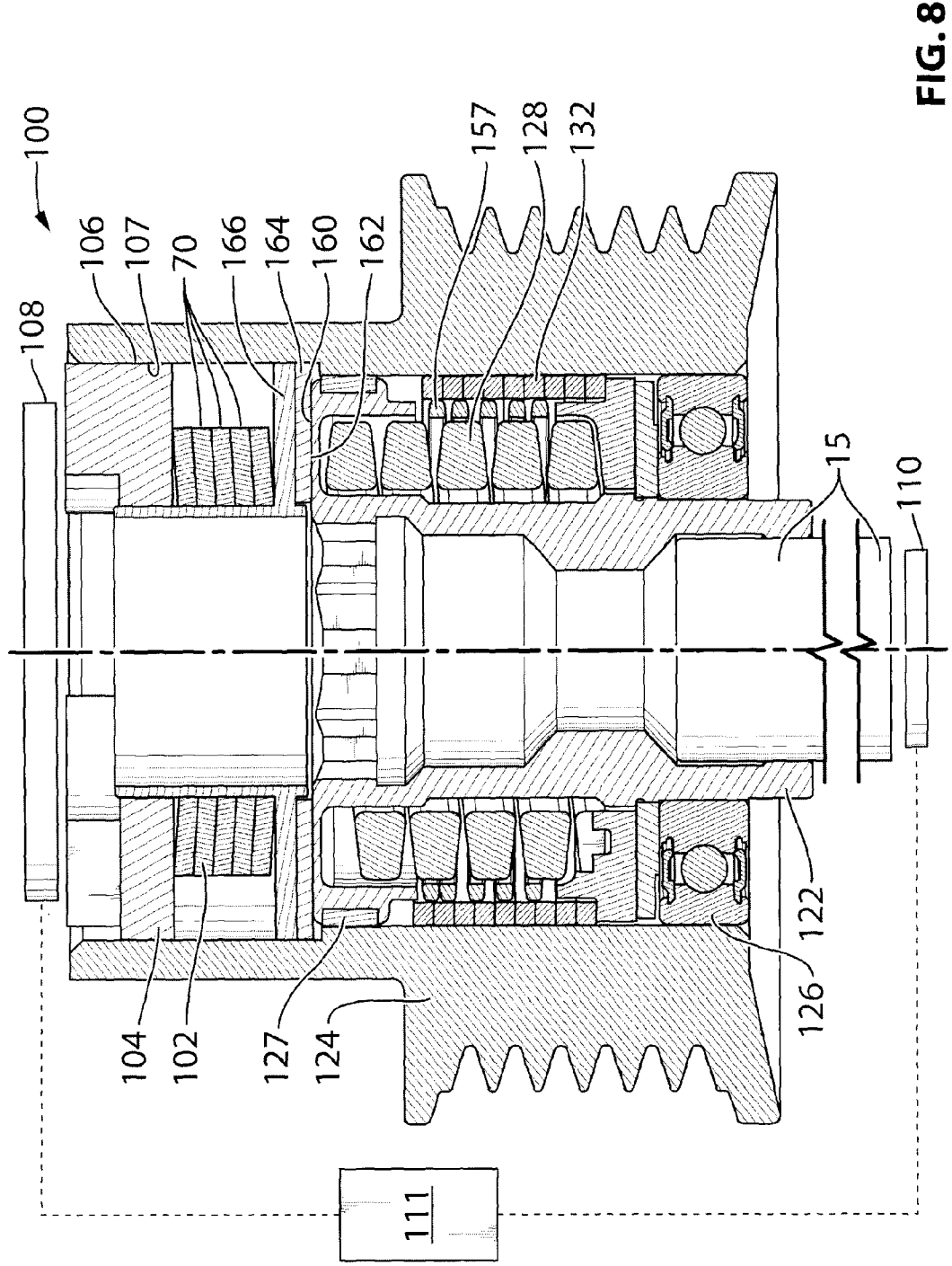
FIG. 8 is a magnified sectional view of a test decoupler that is capable of adjustable damping torque for use in designing the decoupler shown in FIG. 1, in accordance with another embodiment of the invention.

The entity then refines the prediction of the minimum damping torque by conducting tests using the test decoupler 100 in FIG. 8. Preferably the tests are conducted on the actual vehicle containing the actual engine on which the production decoupler 20 will be provided. This permits testing over the most complete range of scenarios (idling while certain belt driven accessories are on, such as the A/C compressor, and while certain electrical accessories are on such as the lights), and can include the actual ECU with its final programming (or as close to it as is available). This is useful because the ECU can provide useful data to the person adjusting the test decoupler 100, such as, for example, alternator current, power steering pressure, A/C pressure, and the like. Additionally, the voltage regulator is in many modern vehicles no longer a separate component. Its function is instead carried out by the ECU. If a complete vehicle is not available for testing, an option is to use a test engine.

Sensors, such as, for example a Rotec sensor by SCHENCK RoTec GmbH of Darmstadt, Germany, may be provided for detecting the angular positions of the pulley 124 and the hub 122 during the above described testing with the test decoupler 100. Using such sensors, the test decoupler 100 can be adjusted in its damping torque (e.g. by adjustment of the retainer to progressively increase the biasing force on the friction member 164) until the angular vibration of the hub 122 falls below the maximum permissible angular vibration to achieve the minimum desired fatigue life for the spring 28. For example, the damping torque may be increased until the angular vibration observed at the hub 122 falls below 1 degree peak-to-peak. It has been observed that providing a suitable amount of damping has a particularly beneficial effect in relation to first order vibrations. More particularly, by damping out first order vibrations transmitted from the engine before they reach the hub 22 (i.e. between the pulley 24 and the hub 22), the aforementioned current fluctuations that occur in the alternator appear to be lower and the voltage regulator appears to have a reduced tendency to react with a switching frequency in the 15 Hz range. As a result, the voltage regulator would contribute less to the vibrations of the hub 22 in that frequency range.

If an engine is not available then an option would be to acquire the components only, such as the alternator, the power steering pump, the A/C compressor, and whatever other accessories are driven by the belt. These components would be mounted onto a thick metal backing plate in the correct X, Y and Z positions (i.e. in the positions they will be mounted in when in the production vehicle), and would be connected and controlled to generate the correct loads (eg. power steering pressure, A/C pressure, etc.) when rotated. This mounting plate may be assembled to a large servo-hydraulic rotary torsional actuator drive system, manufactured by servo-hydraulic companies such as MTS Systems Corporation of Eden Prairie, Minn., USA, Team Machine Tools Inc. of Concord, Ontario, Canada, or Horiba Automotive Test Systems Inc, of Burlington, Ontario, Canada. The driveshaft of the servo-hydraulic rotary torsional actuator drive system may spin the crankshaft from idle (eg. about 600 RPM) to redline (eg. about 7,000 RPM), while imputing simulated torsional vibrations into the belt drive in order to simulate the primary combustion cycle torsional vibration input (e.g. a second-order vibration for a four cylinder engine), and the upper order harmonic vibrations, in order to simulate the operation of a real engine.

During such a test, the torsional vibration within the system may be measured at each major component using any suitable means such as a torsional rotary vibration measurement system, or TRVMS, (which is in effect a sophisticated FFT (fast Fourier transform) analyzer), which is designed specifically for the analysis of rotary torsional vibrations at multiple shafts.

Other quantities may be measured, such as instantaneous belt span tension within each belt span between pulleys (eg. using hub-load sensors), belt span flutter (eg. using lasers or microwave radar sensors), belt tensioner arm oscillation deflection (using suitable sensors), as well as the instantaneous load of each pulley (alternator current, power steering pressure, A/C pressure, etc.).

With these measurements the entity determines the overall 'health' of the belt drive (while 'belt' is used in some instances, it will understood that the endless power transmitting element may be something other than a belt) under several real life conditions which can be programmed and simulated into the MTS servo-hydraulic test machine to mimic the torsional vibrations of the crankshaft.

In such a test, the adjustable test decoupler 100 uses a very fine thread 106 machined into the inner diameter of the lead-in collar (the lead-in collar is the uppermost portion of the pulley 124) so as to permit fine axial adjustment of the retainer 104.

A "drive nut" (i.e. the retainer 104) can be threaded into or out of the threaded lead-in collar by rotating the drive nut in a clockwise or counter-clockwise fashion, thereby adjusting its axial position. The threaded drive nut 104 can be stopped and temporarily locked in any position within the threaded collar, by the use of a secondary locknut in the threaded collar.

The damping ratio (and therefore the damping force and the damping torque) within the test decoupler 100 can be increased by turning the drive nut 104 down onto the wave washer to increase the biasing force exerted by biasing member 102. The damping ratio (and therefore the damping force and the damping torque) can be decreased by backing the drive nut 104 out, decreasing the biasing force exerted by the biasing member 102 on the test friction member 164.

During this test, a variety of different wave washers (Belleville washers) with higher or lower spring rates could be employed. Additionally, a variety of different frictional damping components could be employed, using materials with greater or lesser friction coefficients and longevity characteristics.

Many other tests may be performed by the entity on the endless power transmission element itself, in order to determine its exact mechanical properties (eg. lateral and linear spring rates, stiffness, frictional values, belt stretch, etc).

Once the retainer 104 has been adjusted successfully to provide an angular vibration at the hub 122 that is sufficiently low, the test decoupler 100 may be mounted in a system where the torque exerted by the decoupler 100 and the biasing force exerted by the biasing member 102 can be measured. A torque curve similar to the curve xx in FIG. 7b may be generated. Once this data is known, a design for the production decoupler 20 can be made, wherein particular materials and surface finishes can be selected for use in the first and second friction surfaces 60 and 62, and the biasing member 68 and its biasing force can be selected so as to achieve the particular damping torque that is desired. An example of a material that may, for some applications, be suitable on the friction surface 62 of the friction member 64 is EkaGrip by Ceradyne Inc. of Costa Mesa, Calif., USA. The prototype can then be tested on a production engine and preferably in a production vehicle to verify that is provides less than the maximum the desired angular vibration on the hub 22.

It will be noted that the production decoupler 20 need not be adjustable in terms of its damping force and damping torque.

The adjustable damping arrangement shown and described on the test decoupler 100 may be applied to other types of decouplers, such as those described in U.S. Pat. Nos. 5,156,573, 7,766,774, 7,153,227, 7,591,357, 7,624,852, all of which are incorporated herein by reference in their entirety.

In some embodiments it may be possible to employ two or more different types of biasing member together, such as, for example, a Belleville washer in conjunction with (i.e. in series with or in parallel with) either a single helical compression spring or multiple helical compression springs.

Several other combinations and permutations would be possible also, depending upon the packaging space available for the pulley length and diameter.

While automotive alternator decoupler pulleys are sometimes severely limited in both length and diameter due to underhood packaging constraints, the invention may be applicable to much larger engine applications, such as engines for buses, trucks, military, commercial, construction and industrial engine applications, which may be more tolerant to larger envelope packages. Such engines may permit the larger configurations of the biasing members 68 depicted in FIGS. 4, 5 and 6. Another solution where space is limited may be to provide a hollow shaft for the alternator, and to provide an inner shaft within an outer shaft for the alternator. The outer shaft would be connected to the rotor of the alternator. The pulley 24 would be fixedly mounted to the inner shaft. The rest of the decoupler 20 would be provided to connect the inner and outer shafts, at the opposite end of the alternator to end with the pulley 24.

When manufacturing the decoupler 20, the position of the retainer 69 impacts the biasing force exerted by the biasing member 68 on the friction member 64, which, as noted above, impacts the damping torque provided by the friction surfaces 60 and 62. To ensure that the retainer 69 is positioned in a suitable position so that the desired damping torque is provided, the manufacture of the decoupler 20 can entail:

a) providing an assembly comprising the hub 22, the friction member 64, the thrust member 66 and the biasing member 68;

b) measuring the biasing force exerted by the biasing member 68;

c) compressing (or more generally, flexing) the biasing member 68 to progressively increase the biasing force against the friction member 64 until the measured biasing force reaches a selected value; and d) fixing the retainer 69 in position to maintain the amount of flexure (compression) reached in step c).

Instead of measuring the biasing force and fixing the retainer 69 when a selected force is reached, the process may involve:

a) measuring the amount of compression or flexure in the biasing member 68;

b) compressing it until a selected amount of flexure/compression is reached; and c) fixing the retainer 69 in position to maintain the amount of flexure (compression) reached in step b).

Fixing the retainer 69 may be achieved, for example, by staking the retainer 69 in place in the pulley 24, or by crimping a lip of the pulley 24 into engagement with the retainer 69 to hold the retainer 69 in place. Some types of biasing member may have less sensitivity to small variations in their level of compression (flexure) and so such steps may not be as beneficial. Sufficient consistency from decoupler to decoupler may be achieved in such cases by simply manufacturing them and inserting the retainer in a pre-configured location (e.g. a slot that is milled into the pulley 24 before the biasing member 64 is inserted into the pulley 24 against the thrust member 66. While FIG. 3 shows such an arrangement it is possible that the use of crimping or staking may be preferable so as to provide high consistency in the biasing force exerted by the Belleville washer 70.

It will be noted that any damping torque that is greater than the selected torque would be sufficient to keep the oscillations of the hub 22 sufficiently small so as to keep the operating life of the isolation spring 28 above a desired limit. However, it will be noted that as the damping torque increases, the wear on the friction surfaces 60 and 62 increases, which could impact their operating life, and the parasitic losses associated with use of the decoupler 20 increase. Thus, it is beneficial to keep the damping torque as close as possible to the selected damping torque so as to achieve the intended operating life of the spring 28 while minimizing the wear on the friction surfaces 60 and 62 and minimizing the parasitic losses associated with use of the decoupler 20.

Figure 10:
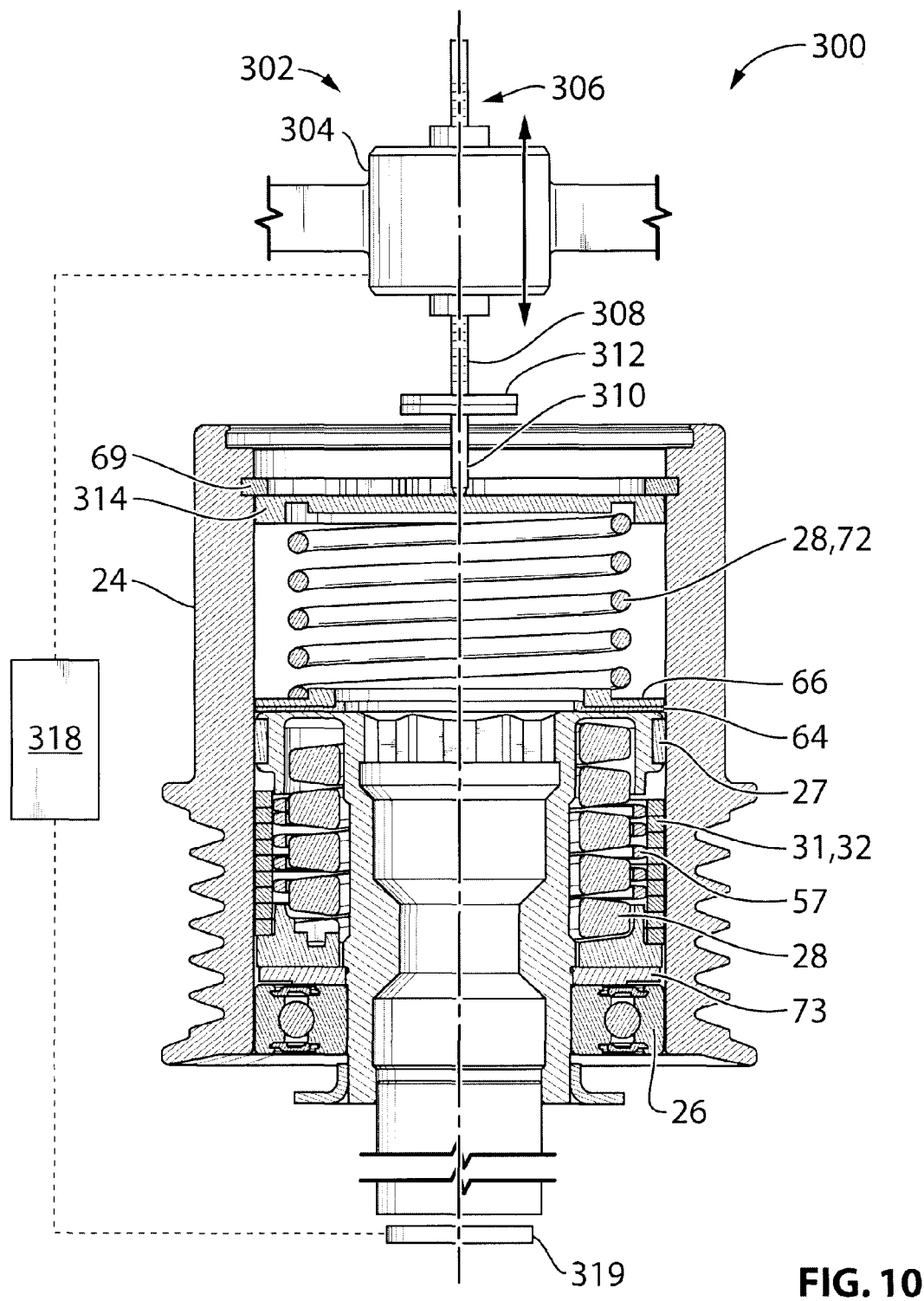
FIG. 10 is a magnified sectional view of a decoupler that is capable of adjustable damping torque and including an actuator for adjustment of the damping torque, in accordance with another embodiment of the invention.

Reference is made to FIG. 10, which shows a decoupler 300 in accordance with another embodiment of the present invention. The decoupler 300 is capable of changing the amount of damping torque that is applied between the pulley 24 and the hub 22. The decoupler 300 may be similar to the decoupler 20 shown in FIG. 4, for example, employing the helical compression spring 72, or alternatively it could be similar to the decoupler 20 shown in FIG. 5 or 6, or even the decoupler 20 shown in FIG. 3. The decoupler 300 includes, however, an actuator 302 that compresses (or more generally, flexes) the biasing member 28 by a selectable amount. The actuator 302, in the embodiment shown in FIG. 10 includes an actuator drive 304 that is mounted to a fixed support member in the vehicle, and a driven member 306 that is operatively engageable with the biasing member 28 (e.g. by directly abutting the biasing member 28). The driven member 306 may be a threaded member 308 that engages a worm gear (not shown) that is rotated by a motor (not shown) in the actuator drive 304. Rotation of the threaded member 308 selectably advances or retracts the threaded member 308 towards and away from the biasing member 28, thereby providing infinite adjustment capability of the biasing force of the biasing member 28 over a particular range of movement of the threaded member. Adjusting the biasing force adjusts the damping torque applied between the hub 22 and pulley 24. The actuator 302 can be controlled to apply a high biasing force (and therefore a high damping torque) in situations where the decoupler 300 is incurring or is predicted to incur high torsional vibrations, and a low biasing force (and therefore a lower damping torque) in all other situations. In this way, a high damping torque is applied when needed to prevent high stresses on the isolation spring 28, and a low damping torque is applied in all other situations thereby reducing parasitic losses associated with the decoupler 300.

Figure 11:
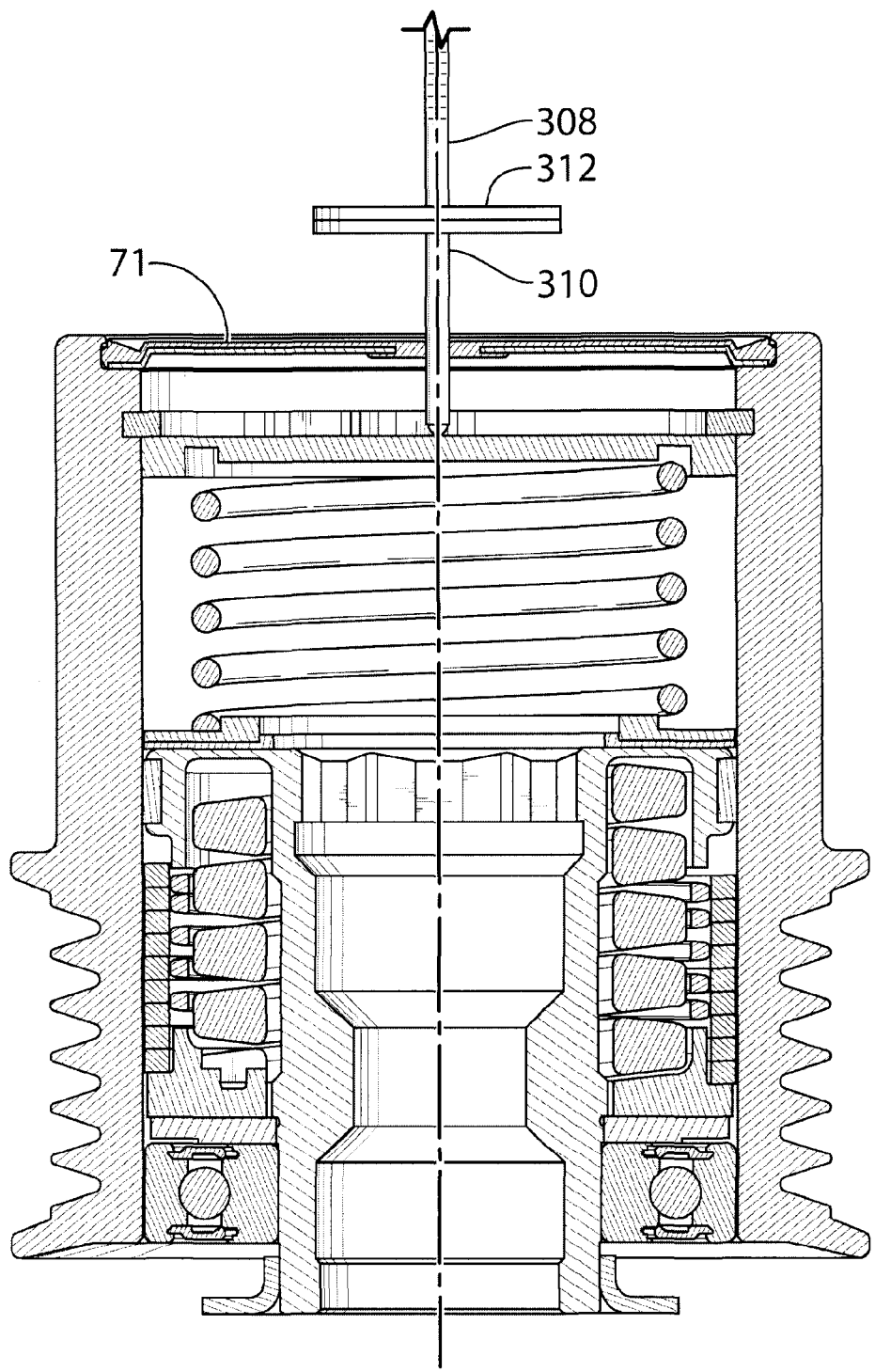
FIG. 11 is a magnified sectional view of a portion of the decoupler shown in FIG. 10.

The driven member 306 in this exemplary embodiment includes the aforementioned threaded member 308, an end member 310, a bearing 312 permitting relative rotation of the threaded member 308 and the end member 310, and an actuator thrust member 314 for receiving the end member 310 and for transmitting the force exerted by the end member 310 on the biasing member 68. A seal cap is not shown in FIG. 10 so as not to obscure the other components of the decoupler 300, however, as shown in FIG. 11, the seal cap 71 may be provided, and includes a pass-through aperture 316 that seals around the axially movable end member 310 so as to prevent the entry of contaminants into the interior of the decoupler 300. Power for the actuator drive 304 (i.e. for the motor) may be obtained from any suitable source such as the vehicle battery (not shown) or from the alternator itself.

The end member 310 may be configured at its tip to have relatively low friction so as to inhibit heat buildup and damage to it and to the thrust member 314 when they are engaged. It will be noted that they may be engaged during high damping torque periods, but they may be spaced from each other (i.e. the end member 310 may be retracted from the thrust member 314 entirely during low damping torque periods. A suitable tip treatment may be for example providing a polymeric (e.g. nylon) spherical tip, or a spherical tip that blends into a conical portion, as shown.

The actuators described herein may include electric motors as described above. However, it is alternatively possible to provide actuators that are pneumatic, hydraulic or powered by any other suitable means. For example, it is possible to provide an actuator that is a phase change actuator that is powered by causing a phase change in a material, such as a wax or any other suitable material. The expansion or contraction, (depending on whether the material melted or solidified), changes the overall volume of the material which is used to drive a member (e.g. a piston in a cylinder housing) in one direction or another. Another type of actuator is powered by a shape memory material such as a shape memory alloy. Where the actuators are shape memory material or phase change materials, electrical power may be used to drive their actuation. In the case of phase change materials, the electrical power may be used to heat them, for example. Where the actuators are pneumatic, they may be vacuum actuators or positive pressure actuators. They may use air bladders, pneumatic cylinders, or some other suitable way of being operated. Any of these actuators may be either linear actuators or rotary actuators.

It will be noted that some of the actuators described herein provide infinite adjustability (e.g. actuator 302) as to the amount of compression is provided on the biasing member 68. It is alternatively possible to provide an actuator that is capable of as few as two positions for a driven member, such as a linear or a rotary solenoid, or a phase-change actuator. The two positions would include a first position wherein the driven member causes the biasing member 68 to exert a relatively high biasing force on the friction member 64 so as to generate a high damping torque, and a second position wherein the driven member causes the biasing member 68 to exert a relatively low biasing force on the friction member 64 so as to generate a low damping torque.

Figure 12:
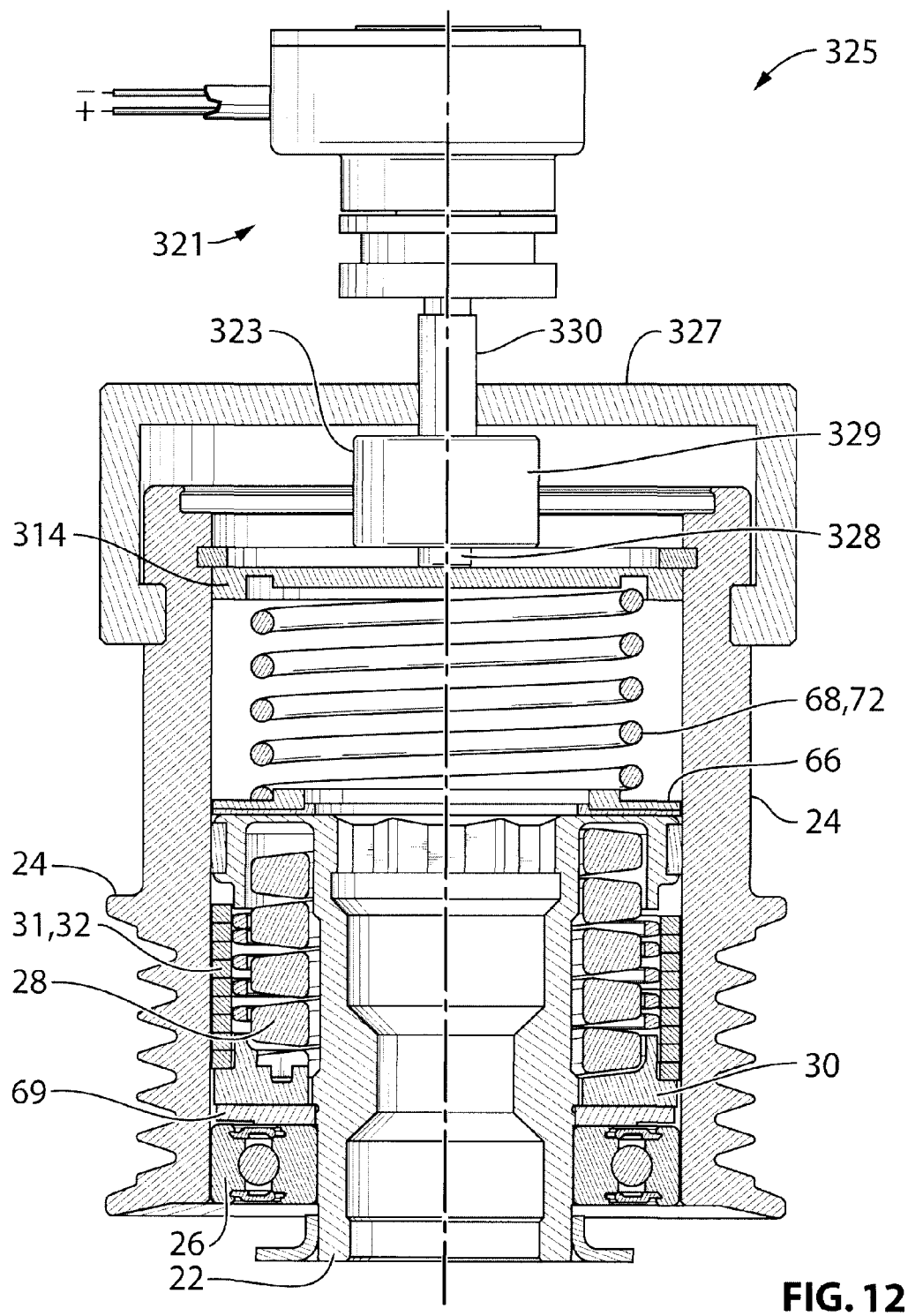
FIG. 12 is a magnified sectional view of another decoupler that is capable of adjustable damping torque and including an actuator for adjustment of the damping torque, in accordance with another embodiment of the invention.

Reference is made to FIG. 12, which shows a decoupler 325 with a phase change actuator 323 that is positioned on the pulley 24 itself. In this embodiment, the pulley 24 has a support member 327 on it that holds the actuator 325. The actuator 323 itself may be any suitable type of actuator, such as, for example, a phase change actuator with a piston 328 and a cylinder 329 filled with a phase change material, such as a suitable wax. The piston 328 would thus constitute the driven member. Heating of the phase change material would drive the piston 328 outward from the cylinder 329 to drive the thrust member 314 to compress the biasing member 68. Cooling of the phase change material would permit the piston 328 to be driven back into the cylinder 329 under the urging of the biasing member 68. To heat the phase change material, electrical power from some source (e.g. the vehicle's battery) would be provided to a slip ring assembly 321 and transmitted therethrough to a shaft 330 that extends from the back of the cylinder 329. Power from this shaft is used to heat the phase change material (e.g. via a resistive heating element).

While the actuator 302 permits the actuator drive 304 to be mounted remotely from the pulley 24, it may be desirable due to underhood packaging constraints to provide an actuator that permits greater flexibility in the positioning of the drive. To address this, an actuator could be provided wherein the driven member is a push-pull cable, which slides within a sheath that has a free end held by a bracket mounted in facing relationship to the thrust member 314. The push-pull cable could be driven forward through the sheath to push the thrust member 314 to compress the biasing member 68 and increase the damping torque. The push-pull cable could be considered to be the driven member such an actuator. The actuator drive itself could be made up of any suitable structure, such as a solenoid having two or more positions that has the push-pull cable connected thereto, or a motor and gear arrangement that has the push-pull cable connected thereto.

The actuator 302 provides infinite adjustability as to the amount of compression is provided on the biasing member 68. It is alternatively possible to provide an actuator that is capable of as few as two positions for a driven member, including a first position wherein the driven member causes the biasing member 68 to exert a relatively high biasing force on the friction member 64 so as to generate a high damping torque, and a second position wherein the driven member causes the biasing member 68 to exert a relatively low biasing force on the friction member 64 so as to generate a low damping torque. Such an actuator could be, for example, a solenoid that is positionable in two or more positions. The solenoid could be a linear solenoid or a rotary solenoid.

Where availability of room is a concern, the alternator shaft itself could be a hollow shaft and a suitable drive could be provided at the other end of the alternator shaft (i.e. the end opposite to the end with the decoupler 20 on it) whereby a driven member extends through the alternator shaft from the other end to the end with the decoupler.

The controller 318 may be provided to control the operation of any of the actuators described herein. Where controller 318 is provided, it may optionally operate the actuator drive based on open loop control. For example, the controller 318 may control the actuator based on inputs such as engine speed, alternator status (charging or not charging), and optionally the status of other accessories driven by the belt 14 (FIG. 1). The controller 318 may position the actuator in a low- or high-damping torque position based on a lookup table with a map of the different combinations of statuses and properties that are measured of the components of the engine.

Alternatively, the controller 318 may optionally operate the actuator drive based on closed loop control. For example, sensors may be provided on several components to assist the controller 318 in determining whether the hub 22 is incurring or is about to incur unacceptably large torsional vibrations. These sensors can be positioned to detect such properties as belt flutter, crankshaft torsional vibrations, hub torsional vibrations, and the like. When the controller 318 detects that large torsional vibrations at the hub 22 are imminent or are being incurred, the controller 318 can operate the actuator to increase the damping torque. While providing the high damping torque the controller 318 can continue to monitor the sensor signals and can reduce the damping torque when it detects that the belt system is stable and large torsional vibrations are no longer imminent.

Suitable sensors can be used to detect the angular position of a rotating object with high precision and thus could be used to detect angular displacements of the hub 22 and pulley 24, and of the crankshaft pulley. As noted above, a suitable sensor would be the 2SA-10 Sentron sensor manufactured by Sentron AG, Baarerstrasse 73, 6300 Zug, Switzerland. Such a sensor may be capable of sensing angular displacement of the hub 22 by being positioned on the other end of the alternator shaft 15 (i.e. the end opposite to the end on which the decoupler is positioned), as shown in FIG. 10. The sensor is shown at 319. The controller 318 would receive signals from sensor 319.

Additionally, suitable sensors could be provided to detect the angular position of a tensioner arm on a tensioner used to tension the belt 14. An example of a suitable sensor for this purpose is the KMZ41 sensor sold by Philips Semiconductor.

While the above description constitutes a plurality of embodiments of the present invention, it will be appreciated that the present invention is susceptible to further modification and change without departing from the fair meaning of the accompanying claims.

Listing of Elements

| Element | Number | FIG. |
|---|---|---|
| Engine | 10 | 1 |
| Crankshaft | 12 | 1 |
| Pulley | 13 | 1 |
| Belt | 14 | 1 |
| Drive shaft | 15 | 1 |
| Accessories | 16 | 1 |
| Alternator | 18 | 1 |
| Decoupler | 20 | 1 |
| Hub | 22 | 2 |
| Pulley | 24 | 2 |
| First bearing member | 26 | 2 |
| Second bearing member | 27 | 2 |
| Isolation spring | 28 | 2 |
| Carrier | 30 | 2 |
| One-way clutch | 31 | 2 |
| Wrap spring | 32 | 2 |
| Outer surface | 40 | 2 |
| Grooves | 42 | 2 |
| Inner surface | 43 | 2 |
| First (proximal) axial end | 44 | 2 |
| Second (distal) axial end | 46 | 2 |
| First helical end | 50 | 3 |
| First end | 51 | 2 |
| Driver wall | 52 | 3 |
| Second helical end | 53 | 2 |
| Radial wall | 55 | 2 |
| Sleeve | 57 | 2 |
| Coils | 58 | 2 |
| Second end | 59 | 2 |
| Thrust plate | 73 | 2 |
| First friction surface | 60 | 3 |
| Second friction surface | 62 | 3 |
| Friction member | 64 | 3 |
| Thrust washer | 66 | 3 |
| Biasing member | 68 | 3 |
| Retainer member | 69 | 3 |
| Belleville washer | 70 | 3 |
| Seal cap | 71 | 2 |
| Helical compression spring | 72 | 4 |

Listing of Elements -continued

| Element | Number | FIG. |
|---|---|---|
| Compression springs | 74 | 5 |
| Biasing member | 76 | 6 |
| Curve | 80 | 7a |
| Peak | 82 | 7a |
| Peak | 84 | 7a |
| Curve | 86 | 7b |
| Peak | 88 | 7b |
| Peak | 90 | 7b |
| Test decoupler | 100 | 8 |
| Biasing member | 102 | 8 |
| Retainer | 104 | 8 |
| Threaded exterior surface | 106 | 8 |
| Threaded surface | 107 | 8 |
| Sensor | 108 | 8 |
| Sensor | 110 | 8 |
| Controller | 111 | 8 |
| Hub | 122 | 8 |
| Pulley | 124 | 8 |
| Bearing member | 126 | 8 |
| Bearing member | 127 | 8 |
| Isolation spring | 128 | 8 |
| Wrap spring | 132 | 8 |
| Sleeve | 157 | 8 |
| Friction surface | 160 | 8 |
| Friction surface | 162 | 8 |
| Friction member | 164 | 8 |
| Thrust member | 166 | 8 |
| Method step | 201 | 9 |
| Method step | 202 | 9 |
| Method step | 204 | 9 |
| Method step | 206 | 9 |
| Method step | 208 | 9 |
| Decoupler | 300 | 10 |
| Actuator | 302 | 10 |
| Actuator drive | 304 | 10 |
| Driven member | 306 | 10 |
| Threaded member | 308 | 10 |
| End member | 310 | 10 |
| Bearing | 312 | 10 |
| Thrust member | 314 | 10 |
| Pass-through aperture | 316 | 11 |
| Controller | 318 | 11 |
| Slip ring assembly | 321 | 12 |
| Decoupler | 325 | 12 |
| Phase change actuator | 323 | 12 |
| Support member | 327 | 12 |
| Piston | 328 | 12 |
| Cylinder | 329 | 12 |
| Shaft | 330 | 12 |

The invention claimed is:

1. A decoupler for transferring torque between a shaft and an endless power transmitting element, said decoupler, comprising:
   a hub that is adapted to be coupled to the shaft such that the shaft co-rotates with the hub about a rotational axis;
   a pulley rotatably coupled to the hub, the pulley having an outer periphery that is adapted to engage the endless power transmitting element;
   an isolation spring positioned to transfer rotational force from the pulley to the hub and to accommodate torsional vibration between the pulley and the hub; and
   a first friction surface operatively connected with the pulley;
   a second friction surface operatively connected with the hub;
   a friction surface biasing member positioned for exerting a biasing force to biasing the first and second friction surfaces against each other; and
   a retainer that is engaged with the friction surface biasing member and positioned to cause the friction surface biasing member to apply at least a selected biasing force on the first and second friction surfaces thereby generating at least a selected damping torque during relative rotational movement between the pulley and the hub, wherein the first and second friction surfaces are engaged with one another sufficiently to attenuate first order vibrations from an engine that drives the endless drive member, to result in less than a selected peak to peak angular range of movement between the hub and pulley, wherein the biasing force is selected so that the damping torque is sufficiently high to inhibit angular vibration on the hub from exceeding a selected peak-to-peak angle during use of the decoupler on an engine generating a selected torsional vibration at the pulley over a selected range of frequencies, wherein the selected range of frequencies is about 5 Hz to about 20 Hz.

2. A decoupler as claimed in claim 1, wherein the selected peak-to-peak angle is less than about 1 degree.

3. A decoupler as claimed in claim 1, wherein the selected peak-to-peak angle is selected based on providing a selected fatigue life for the isolation spring.

4. A decoupler as claimed in claim 1, wherein the shaft is the shaft of an alternator.

5. A decoupler as claimed in claim 4, wherein the engine is a 4-cylinder engine.

6. An endless drive arrangement for an engine, comprising:

a crankshaft pulley driven by a crankshaft from the engine;

an alternator pulley mounted to an input shaft of an alternator;

an endless drive member that is positioned to transfer power from the crankshaft pulley to the alternator pulley, wherein first order vibrations are produced at the crankshaft; and a decoupler between the endless drive member and at least one of the alternator pulley and the crankshaft pulley, wherein the decoupler is damped sufficiently to attenuate said first order vibrations to result in less than a selected peak to peak angular range of movement at the input shaft of the alternator, wherein the selected peak-to-peak angle is less than about 1 degree.

7. An endless drive arrangement as claimed in claim 6, wherein the decoupler includes:

a hub that is adapted to be coupled to the shaft such that the shaft co-rotates with the hub about a rotational axis;

a pulley rotatably coupled to the hub, the pulley having an outer periphery that is adapted to engage the endless power transmitting element;

an isolation spring positioned to transfer rotational force from the pulley to the hub and to accommodate torsional vibration between the pulley and the hub; and a first friction surface operatively connected with the pulley;

a second friction surface operatively connected with the hub;

a friction surface biasing member positioned for exerting a biasing force to biasing the first and second friction surfaces against each other; and a retainer that is engaged with the friction surface biasing member and positioned to cause the friction surface biasing member to apply at least a selected biasing force on the first and second friction surfaces thereby generating at least a selected damping torque during relative rotational movement between the pulley and the hub.

8. An endless drive arrangement as claimed in claim 6, wherein the selected peak-to-peak angular range of movement is selected based on providing a selected fatigue life for the isolation spring.

* * * * *